(12) United States Patent
Chong et al.

(10) Patent No.: US 11,617,092 B2
(45) Date of Patent: Mar. 28, 2023

(54) DATA ANALYTICS METHOD AND APPARATUS

(71) Applicant: HUAWEI TECHNOLOGIES CO., LTD., Shenzhen (CN)

(72) Inventors: Weiwei Chong, Shanghai (CN); Yang Xin, Shanghai (CN); Xiaobo Wu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 175 days.

(21) Appl. No.: 16/832,719

(22) Filed: Mar. 27, 2020

(65) Prior Publication Data

US 2020/0228999 A1    Jul. 16, 2020

Related U.S. Application Data

(63) Continuation of application No. PCT/CN2018/104096, filed on Sep. 5, 2018.

(30) Foreign Application Priority Data

Sep. 30, 2017   (CN) .......................... 201710913574.1

(51) Int. Cl.
*H04W 16/22* (2009.01)
*H04W 24/08* (2009.01)
(52) U.S. Cl.
CPC ........... *H04W 16/22* (2013.01); *H04W 24/08* (2013.01)
(58) Field of Classification Search
None
See application file for complete search history.

(56) References Cited

U.S. PATENT DOCUMENTS 9,179,007 B1    11/2015  Yadav et al.
2016/0337905 A1  11/2016  Zhang et al.
(Continued)

FOREIGN PATENT DOCUMENTS

CN    101399843 A    4/2009
CN    103051629 A    4/2013
(Continued)

OTHER PUBLICATIONS

Huawei,"Discussion about Big Data Driven Network Architecture", SA WG2 Meeting #121, S2-173192, May 15, 2017, Hangzhou, China, total 11 pages.
(Continued)

*Primary Examiner* — Jamaal Henson
(74) *Attorney, Agent, or Firm* — Rimon PC

(57) ABSTRACT

Embodiments of this application provide a data analytics method and data analytics apparatus. The method includes obtaining, by a user plane data processing network element, at least one matching condition that is from a data analytics network element, where each of the at least one matching condition corresponds to at least one service type or at least one execution rule. The method further includes obtaining, by the user plane data processing network element based on the at least one matching condition, a service type associated with user plane data or an execution rule associated with the user plane data. Embodiments of this application implement data analytics by using the data analytics network element in a communications network.

19 Claims, 5 Drawing Sheets

(56) References Cited

U.S. PATENT DOCUMENTS

| | | | |
|---|---|---|---|
| 2017/0332282 A1* | 11/2017 | Dao | H04L 1/0026 |
| 2017/0359749 A1* | 12/2017 | Dao | H04L 47/2416 |
| 2018/0054817 A1* | 2/2018 | Jabara | H04W 88/085 |
| 2018/0262924 A1* | 9/2018 | Dao | H04W 24/02 |

FOREIGN PATENT DOCUMENTS

| | | | | |
|---|---|---|---|---|
| CN | 108547969 A * | 9/2018 | | F16K 27/067 |
| CN | 108574969 A * | 9/2018 | | H04W 36/0033 |
| WO | 2015113291 A1 | 8/2015 | | |
| WO | WO-2017222344 A1 * | 12/2017 | | H04W 36/023 |
| WO | WO-2018174846 A1 * | 9/2018 | | |

OTHER PUBLICATIONS

3GPP TR 29.890 V0.2.0 (May 1, 2017);3rd Generation Partnership Project;Technical Specification Group Core Network and Terminals;Study on CT WG3 Aspects of 5G System Phase 1;Stage 3(Release 15);total 42 pages.

* cited by examiner

DATA ANALYTICS METHOD AND APPARATUS

CROSS-REFERENCE TO RELATED APPLICATION

This application is a continuation of International Application No. PCT/CN2018/104096, filed on Sep. 5, 2018, which claims priority to Chinese Patent Application No. 201710913574.1, filed on Sep. 30, 2017. The disclosure of the aforementioned applications are hereby incorporated by reference in their entireties.

TECHNICAL FIELD

Embodiments of this application relate to the communications field, and more specifically, to a data analytics method and apparatus.

BACKGROUND

In a 5th generation (5G) communications network, a network data analytics (NWDA) network element is introduced. The NWDA network element performs model training by using a big data analytics method, and analyzes data by using a trained model. However, the prior art does not provide methods for analyzing the data using the NWDA network element in the communications network.

SUMMARY

Embodiments of this application provide a data analytics method and data analytics apparatus, capable of implementing data analytics by using a data analytics network element in a communications network.

According to a first aspect of this application, a data analytics method is provided, and includes: obtaining, by a user plane data processing network element, at least one matching condition that is from a data analytics network element, where each of the at least one matching condition corresponds to at least one service type or at least one execution rule; receiving, by the user plane data processing network element, user plane data; and obtaining, by the user plane data processing network element based on the at least one matching condition, a service type associated with the user plane data or an execution rule associated with the user plane data. This embodiment of this application implements data analytics by using the data analytics network element in the communications network.

In a first possible implementation of the first aspect, the obtaining, by the user plane data processing network element based on the at least one matching condition, an execution rule associated with the user plane data includes: determining, by the user plane data processing network element in the at least one matching condition, the matching condition that the user plane data satisfies; obtaining, by the user plane data processing network element, the execution rule that is from a policy control network element and that corresponds to the matching condition that the user plane data satisfies; or obtaining, by the user plane data processing network element, the execution rule that is from the data analytics network element and that corresponds to the matching condition that the user plane data satisfies.

In a second possible implementation of the first aspect, the user plane data processing network element processes the user plane data based on the service type associated with the user plane data or the execution rule associated with the user plane data.

With reference to the second possible implementation of the first aspect, in a third possible implementation of the first aspect, that the user plane data processing network element processes the user plane data based on the service type associated with the user plane data or the execution rule associated with the user plane data includes: determining, by the user plane data processing network element, that a destination address of the user plane data is an address of a terminal device, and the terminal device is in an idle state; and sending, by the user plane data processing network element, paging priority information of the terminal device to a session management network element based on the service type associated with the user plane data or the execution rule associated with the user plane data.

With reference to the second possible implementation of the first aspect, in a fourth possible implementation of the first aspect, that the user plane data processing network element processes the user plane data based on the service type associated with the user plane data or the execution rule associated with the user plane data includes: forwarding, by the user plane data processing network element, the user plane data based on service priority information indicated in the execution rule associated with the user plane data; or adding, by the user plane data processing network element, label information of the service type for the user plane data based on the service type associated with the user plane data or the execution rule associated with the user plane data; or adding, by the user plane data processing network element, scheduling priority information for the user plane data based on the service type associated with the user plane data or the execution rule associated with the user plane data; or performing, by the user plane data processing network element, charging statistics on the user plane data based on the service type associated with the user plane data or policy and charging rules associated with the user plane data.

In any one of possible implementations of the first aspect, the obtaining, by the user plane data processing network element based on the at least one matching condition, a service type associated with user plane data includes: determining, by the user plane data processing network element in the at least one matching condition, the matching condition that the user plane data satisfies; obtaining, by the user plane data processing network element, service type information that is from the data analytics network element and that corresponds to the matching condition that the user plane data satisfies; and obtaining, by the user plane data processing network element based on the service type information, the service type associated with the user plane data.

In any one of possible implementations of the first aspect, each of the at least one matching condition includes at least one matching feature and a condition that the at least one matching feature satisfies; and the determining, by the user plane data processing network element in the at least one matching condition, the matching condition that the user plane data satisfies includes: determining, by the user plane data processing network element, that the user plane data has all or some of matching features of one matching condition, and meets a condition that the all or some of the matching features satisfy.

In any one of possible implementations of the first aspect, the determining, by the user plane data processing network element in the at least one matching condition, the matching condition that the user plane data satisfies includes: obtaining, by the user plane data processing network element, one or more matching features corresponding to the user plane data; selecting, by the user plane data processing network element, some matching conditions from the at least one matching condition based on the one or more matching features; and determining, by the user plane data processing network element based on the selected matching conditions, the matching condition that the user plane data satisfies.

The one or more matching features corresponding to the user plane data include Internet protocol IP 5-tuple information; and the selecting, by the user plane data processing network element, some matching conditions from the at least one matching condition based on the one or more matching features includes: selecting, by the user plane data processing network element from the at least one matching condition, the matching condition of which the IP 5-tuple information is consistent with IP 5-tuple information of the user plane data.

According to a second aspect of this application, a data analytics method is provided, and includes: obtaining, by a data analytics network element, at least one matching condition, where each of the at least one matching condition corresponds to at least one service type or at least one execution rule; and sending, by the data analytics network element, the at least one matching condition to a user plane data processing network element.

In a first possible implementation of the second aspect, the obtaining, by a data analytics network element, at least one matching condition includes: receiving, by the data analytics network element, one or more matching features that are from a policy control network element; and selecting, by the data analytics network element, the at least one matching condition from a pre-obtained matching condition based on the one or more matching features.

With reference to the first possible implementation of the second aspect, in a second possible implementation of the second aspect, the one or more matching features include a data network name and/or identifier information of the user plane data processing network element corresponding to a data network; and the selecting, by the data analytics network element, the at least one matching condition from a pre-obtained matching condition based on the one or more matching features includes: selecting, by the data analytics network element, from the pre-obtained matching condition, the matching condition consistent with the data network name and/or the identifier information of the user plane data processing network element corresponding to the data network.

In any one of possible implementations of the second aspect, the method further includes: sending, by the data analytics network element, service type information corresponding to the at least one matching condition to a policy control network element or the user plane data processing network element.

In any one of possible implementations of the second aspect, the method further includes: sending, by the data analytics network element, the execution rule corresponding to the at least one matching condition to the policy control network element or the user plane data processing network element.

In any one of possible implementations of the second aspect, the method further includes: obtaining, by the data analytics network element, training data corresponding to at least one service type; and the obtaining, by a data analytics network element, at least one matching condition includes: obtaining, by the data analytics network element, the at least one matching condition based on the training data.

According to a third aspect of this application, a data analytics method is provided, and includes: obtaining, by a policy control network element, at least one matching condition that is from a data analytics network element, where each of the at least one matching condition corresponds to at least one service type or at least one execution rule; and sending, by the policy control network element, at least some of the at least one matching condition to a user plane data processing network element.

In a first possible implementation of the second aspect, the method further includes: selecting, by the policy control network element, the at least some matching conditions from the at least one matching condition based on some matching features.

With reference to the first possible implementation of the second aspect, in a second possible implementation of the second aspect, the one or more matching features include a data network name and/or identifier information of the user plane data processing network element corresponding to a data network; and that the policy control network element selects the some matching conditions from the at least one matching condition based on the one or more matching features includes: selecting, by the policy control network element from the at least one matching condition, the matching condition consistent with the data network name and/or the identifier information of the user plane data processing network element corresponding to the data network.

In any one of possible implementations of the third aspect, the method further includes: sending, by the policy control network element, service type information corresponding to the at least some matching conditions to the user plane data processing network element.

In any one of possible implementations of the third aspect, the method further includes: sending, by the policy control network element, the execution rule corresponding to the at least some matching conditions to the user plane data processing network element.

In any one of possible implementations of the third aspect, the method further includes: obtaining, by the policy control network element, the service type information that is from the data analytics network element and that corresponds to the at least some matching conditions; generating, by the policy control network element based on the obtained service type information, the execution rule corresponding to the at least some matching conditions; and sending, by the policy control network element, the execution rule corresponding to the at least some matching conditions to the user plane data processing network element.

According to a fourth aspect of this application, a data analytics method is provided, and includes: obtaining, by a user plane data processing network element, a matching condition that is from a data analytics network element, where the matching condition corresponds to one service type or one execution rule; receiving, by the user plane data processing network element, user plane data; and obtaining, by the user plane data processing network element based on the matching condition, the service type associated with the user plane data or the execution rule associated with the user plane data.

According to a fifth aspect of this application, a data analytics method is provided, and includes: obtaining, by a data analytics network element, a matching condition, where the matching condition corresponds to one service type or one execution rule; and sending, by the data analytics network element, the matching condition to a user plane data processing network element.

According to a sixth aspect of this application, a data analytics method is provided, and includes: obtaining, by a policy control network element, a matching condition that is from a data analytics network element, where the matching condition corresponds to one service type or one execution rule; and sending, by the policy control network element, the matching condition to a user plane data processing network element.

According to a seventh aspect of this application, a data analytics apparatus is provided, and includes: a transceiver unit, configured to obtain at least one matching condition that is from a data analytics network element and receive user plane data, where each of the at least one matching condition corresponds to at least one service type or at least one execution rule; and a processing unit, configured to obtain, based on the at least one matching condition, a service type associated with user plane data or an execution rule associated with the user plane data.

According to an eighth aspect of this application, a data analytics apparatus is provided, and includes: a processing unit, configured to obtain at least one matching condition, where each of the at least one matching condition corresponds to at least one service type or at least one execution rule; and a transceiver unit, configured to send the at least one matching condition to a user plane data processing network element.

According to a ninth aspect of this application, a data analytics apparatus is provided, and includes: a processing unit and a transceiver unit; the processing unit, configured to obtain at least one matching condition that is from a data analytics network element through the transceiver unit, where each of the at least one matching condition corresponds to at least one service type or at least one execution rule; and the processing unit, further configured to send at least some of the at least one matching condition to a user plane data processing network element through the transceiver unit.

According to a tenth aspect of this application, a data analytics apparatus is provided, and includes: a storage unit, configured to store a computer instruction; and a processing unit, configured to perform any method according to the foregoing first aspect to sixth aspect and possible implementations based on the computer instruction stored in the storage unit.

According to an eleventh aspect of this application, a computer storage medium is provided. The computer-readable storage medium stores an instruction, and when the instruction is run on a computer, the computer is enabled to perform any method according to the foregoing first aspect to sixth aspect and possible implementations.

According to a twelfth aspect of this application, a computer program product including an instruction is provided, when the instruction is run on a computer, the computer is enabled to perform any method according to the foregoing first aspect to sixth aspect and possible implementations.

DESCRIPTION OF EMBODIMENTS

Embodiments of this application may be used in a long term evolution (LTE) network, a 5G or next generation network, a fixed network, a home NodeB network, a non-3GPP (such as Wi-Fi) accessed mobile network, or the like. In this application, an example in which the embodiments of this application are applied to the 5G network is used for descriptions.

Embodiments of this application may be used in a global system for mobile communications (GSM) network, a wideband code division multiple access (WCDMA) network, a long term evolution (LTE) network, a 5G or next-generation network, a fixed network, a home NodeB network, a non-3GPP (such as Wi-Fi) accessed mobile network, or the like. In this application, an example in which the embodiments of this application are applied to the 5G network is used for descriptions.

Figure 1:
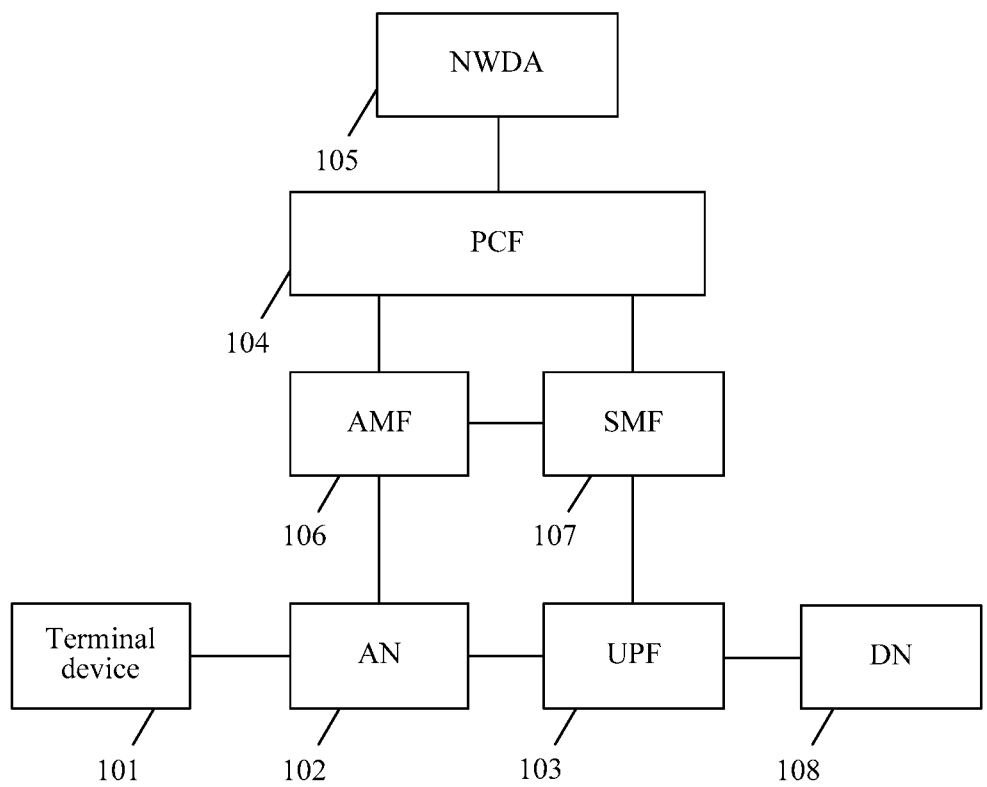
FIG. 1 is a schematic diagram of a communications system that implements an embodiment of this application.

FIG. 1 is a schematic diagram of a communications system that can implement an embodiment of this application. In the communications system, a terminal device 101 accesses a core network by using an access network (AN) device 102.

The terminal device 101 includes but is not limited to: user equipment (UE), a subscriber unit, a subscriber station, a mobile station, a mobile console, a remote station, a remote terminal device, a mobile terminal device, a user terminal device, a terminal device, a wireless communications device, a user agent, a user apparatus, a cellular phone, a cordless phone, a session initiation protocol (SIP) phone, a wireless local loop (WLL) station, a personal digital assistant (PDA), a handheld device having a wireless communications function, a computing device, a processing device connected to a wireless modem, an in-vehicle device, a wearable device, a terminal device in the Internet of Things, a household appliance, a virtual reality device, a terminal device in a 5G network, a terminal device in a future evolved public land mobile network (PLMN), or the like.

The access network device 102 may be a device that communicates with the terminal device 101. The access network device may provide communication coverage for a specific geographic area, and may communicate with a terminal device within the coverage area (a cell). The access network device 102 may communicate with any quantity of terminal devices. There may be a plurality of air interface connections between the access network device 102 and the terminal device 101. For example, there are two air interface connections between the access network device 102 and the terminal device 101, and the two air interface connections are respectively used to transmit a data flow A and a data flow B. The access network device may support communications protocols in different standards, or may support different communication modes. For example, the access network device 102 is an evolved NodeB (eNodeB), a Wireless Fidelity access point (Wi-Fi AP), a worldwide interoperability for microwave access base station (WiMAX BS), or a radio controller in a cloud radio access network (CRAN), or the network device may be an access network device in the 5G network or an access network device in the future evolved PLMN, or the like.

The core network may include: a control plane function (CPF) network element, a user plane function (UPF) network element 103, a policy control function (PCF) network element 104, and a network data analytics (NWDA) network element 105. The control plane function network element may include an access management function (AMF) network element 106 and a session management function (SMF) network element 107. By using the access network device 102 and the user plane function network element 103, transmission of user plane data between the terminal device 101 and a data network (DN) 108 may be implemented.

The PCF network element 104 has a policy control decision function, to provide a policy for a network. The NWDA network element 105 is configured for big data learning and analytics. The AMF network element 106 is configured for mobility management, lawful interception, access authorization/authentication, and the like. The SMF network element 107 is configured to implement session and bearer management, IP address allocation, and the like. The DN 108 is a network used to transmit data. Specifically, the DN 108 may comprise an Internet protocol (IP) multimedia subsystem (IMS) server, a packet data network (PDN), or an application server (App server).

It can be understood that in the communications system shown in FIG. 1, functions of various composition network elements are merely examples. When the various composition network elements are applied to the embodiments of this application, not all the functions are necessarily needed.

In the embodiments of this application, "and/or" describes only an association relationship for describing associated objects and represents that three relationships may exist. For example, A and/or B may represent the following cases: Only A exists, both A and B exist, and only B exists. In addition, in the descriptions of this application, "a plurality of" means two or more than two.

In the embodiments of this application, that a network element (such as an A network element) obtains information that is from another network element (such as a B network element) may mean that the A network element directly receives the information from the B network element, or may mean that the A network element receives the information from the B network element by using another network element (such as a C network element). When the A network element receives the information from the B network element by using the C network element, the C network element may transparently transmit the information, or may process the information. For example, the C network element carries the information in different messages for transmission or selects the information, and only sends selected information to the A network element. Similarly, in various embodiments of this application, that the A network element sends information to the B network element may mean that the A network element directly sends the information to the B network element, or may mean that the A network element sends the information to the B network element by using another network element (such as the C network element).

Figure 2:
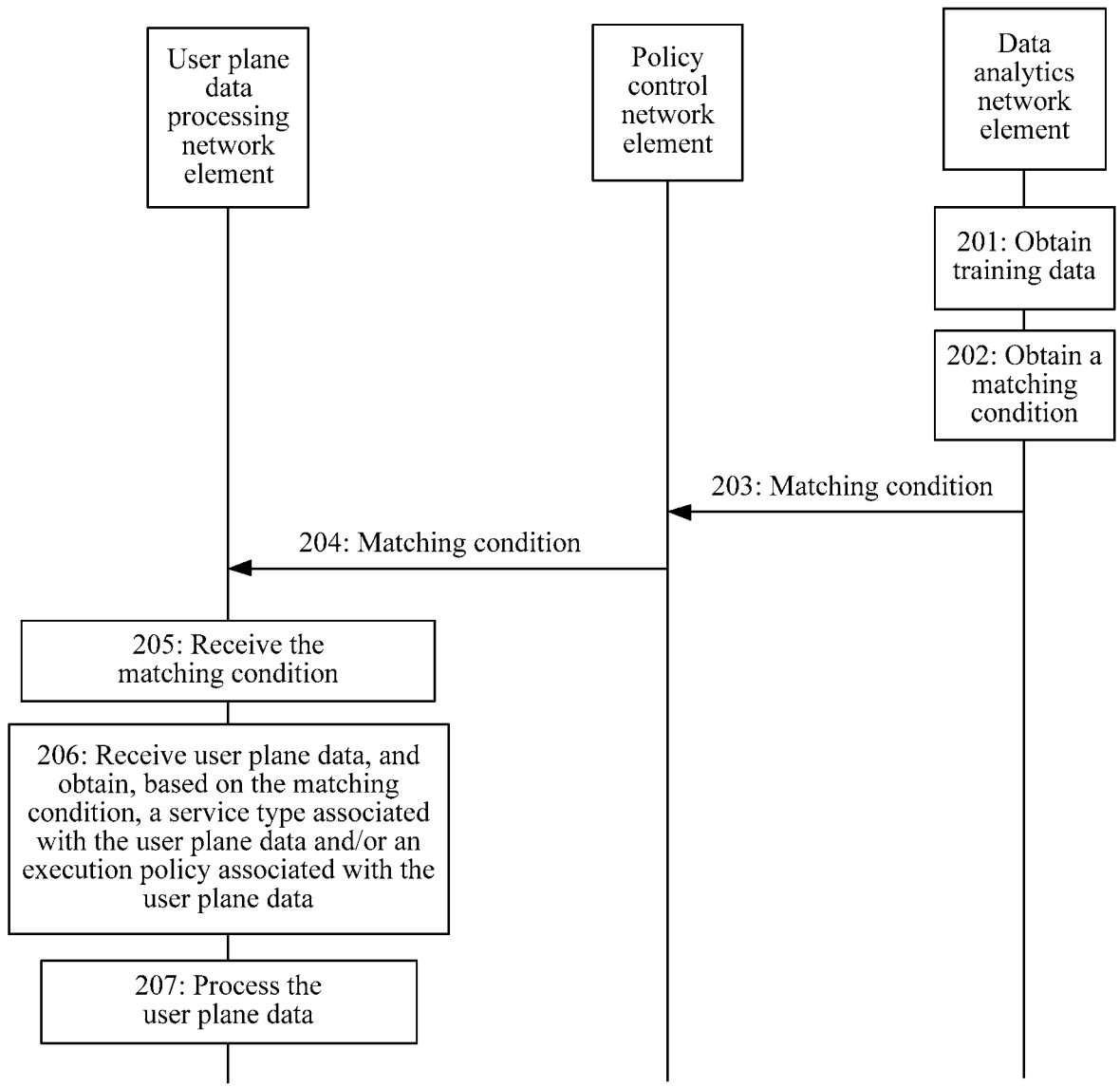
FIG. 2 is a schematic flowchart of a data analytics method according to a first embodiment of this application.

FIG. 2 is a schematic flowchart of a data analytics method according to a first embodiment of this application. The data analytics method includes the following steps.

Step 201. A data analytics network element obtains training data.

The data analytics network element may be the NWDA network element in
FIG. 1. The data analytics network element may alternatively be another network element having a network data analytics function. This is not limited herein.

The data analytics network element may obtain the training data from another network element, or the data analytics network element may obtain the training data from a same network element set. Specifically, the other network element may be a telecommunication network device, or may be a third party server. The telecommunication network device may be at least one of the following devices: a terminal device, an access network device, a control plane function network element (such as an AMF network element or an SMF network element), a UPF network element, a PCF network element, a network management system (such as a business support system (BSS), an operation support system (OSS), or a management support system (MSS)) network element, a unified data management (UDM)) network element, and an IMS network element. The third party server may be at least one of an App Server, an OTT (over the top) server, or a vertical industry management and control center.

The data analytics network element may directly obtain the training data by performing data exchange with another network element. Alternatively, the data analytics network element may indirectly obtain the training data by using another network element. For example, the data analytics network element obtains data from the third party server by using a network exposure function (NEF) network element.

The data analytics network element may obtain the training data from the other network element in real time, or the data analytics network element may obtain the training data when the data analytics network element and/or another network element are/is idle.

The training data obtained by the data analytics network element may be original data. The training data obtained by the data analytics network element may alternatively be data pre-processed by another network element. For example, to protect user privacy, an application server cleanses sensitive information in the original data, and sends processed data to the data analytics network element.

The training data obtained by the data analytics network element may be network data, such as an address of a terminal device, a cell identifier (cell ID), time information, a network congestion state, and the like. The training data obtained by the data analytics network element may alternatively be application data, such as IP 5-tuple, a user plane data size, a user plane data interval, a service type, service experience, an extended field, or the like. The data analytics network element may further associate the obtained application data with network data, to obtain associated training data. For example, the data analytics network element associates the application data with the network data based on the address and/or the time information of the terminal device. The address of the terminal device may be an IP address, or may be an Ethernet address.

The data analytics network element may obtain the training data by using the service type as a granularity. For example, the data analytics network element obtains training data of a payment service and training data of a voice over long term evolution (VOLTE) service.

Alternatively, the data analytics network element may obtain the training data by using a network element as a granularity. For example, training data obtained from the terminal device may include: a type of the terminal, an address of the terminal device, a version of an operating system, a temperature of the terminal device, an electric quantity of the terminal device, cell radio channel quality measured by the terminal device, and the like. Training data obtained from a session management network element may include: an identifier (ID) of the session management network element, an address of the terminal device, a data network name (DNN), and the like. Training data obtained from a user plane function network element may include: an ID of the user plane function network element, a tunnel end point identifier (TEID), a congestion level, IP 5-tuple, a user plane data size, a quantity of pieces of user plane data, and the like. Training data obtained from the access network device may include: a cell identifier, a quality of service (Qos) parameter, real-time radio channel quality (such as a reference signal receiving power (RSRP), reference signal received quality (RSRQ), a signal to interference plus noise ratio (SINR)), a service switching threshold, a filtering coefficient, an antenna tilt, a carrier frequency, a carrier, a packet loss rate, a guaranteed bit rate (GBR), a maximum bit rate (MBR), a congestion level, and the like.

Training data obtained from the third party server may include: IP 5-tuple, a start time, an end time, a service type, and the like.

In the embodiments of this application, that the user plane data is a data packet is used as an example for description.

Step 202: The data analytics network element analyzes the training data, to obtain a matching condition.

The data analytics network element uses a big data analytics method to analyze the training data obtained in step 201, to obtain at least one matching condition. Each of the at least one matching condition corresponds to at least one service type or at least one execution rule. The execution rule may be at least one of an enforcement policy, a control policy, a charging policy, or policy & charging control (PCC) rules. The PCC rule may include a service quality policy.

The data analytics network element analyzes training data of various service types separately, to obtain the matching condition corresponding to each service type. One service type may uniquely correspond to one matching condition, or one service type may correspond to a plurality of matching conditions; and one matching condition may uniquely correspond to one service type, or one matching condition may correspond to a plurality of service types. When one matching condition corresponds to a plurality of service types, a corresponding service type may further be determined with reference to a condition or feature other than the matching condition. This is not limited herein.

The data analytics network element determines an execution rule of the service type based on the service type corresponding to the matching condition, namely, an execution rule corresponding to the matching condition. The data analytics network element may alternatively determine, based on a feature in the matching condition, an execution rule corresponding to the matching condition. For example, the data analytics network element may determine, based on features such as the radio channel quality, congestion level, packet loss rate, and switching threshold that are in the matching condition, the execution rule corresponding to the matching condition. The data analytics network element may further determine, based on the training data, a feature (for example, the radio channel quality, congestion level, packet loss rate, and switching threshold) related to the execution rule, and send the feature related to the execution rule to a policy control network element. The policy control network element determines the execution rule.

Each matching condition includes at least one matching feature and a condition that the at least one matching feature satisfies. Optionally, each matching condition may further include a feature index corresponding to the matching feature. The condition that the matching feature satisfies may be a value or value range of the matching feature, or the condition that the matching feature satisfies may be specific content of the matching feature, for example, a specific name of a data network. The value or value range of the matching feature may be an actual value or value range of the feature, or may be a value or value range obtained after the actual value or value range of the feature is processed, for example, a normalized value or value range, or a quantized value or value range.

When one matching condition includes a plurality of matching features, the plurality of matching features may be represented in a form of a feature list, and the matching condition may be represented in the form of a table. The matching features of the matching conditions may be partially the same, or may be totally different. The matching condition may further include service type information corresponding to the matching condition, for example, one row or one column is added to the feature list to indicate a service type corresponding to the matching condition. The matching condition may further include execution rule information corresponding to the matching condition, for example, one row or one column is added to the feature list to indicate the execution rule information corresponding to the matching condition. The execution rule information may be a specific execution rule, or may be a feature related to an execution rule, or may be a number of execution rules, or the like.

The data analytics network element may obtain a matching feature of a service granularity. For example, if a size of a data packet corresponding to training data of a service is a specific value or belongs to a specific range, the data analytics network element may use the size of the data packet as a matching feature of the service. For another example, if a data packet corresponding to training data of a service is from a specific data network or some specific data networks, the data analytics network element may use a data network name as another matching feature of the service.

The data analytics network element may obtain a matching feature of a terminal device granularity. For example, data packet features of a service corresponding to terminal devices produced by different vendors may be different. When needing to distinguish the service of different terminal devices, the data analytics network element may use types of terminal device as a matching feature of the service. Optionally, the data analytics network element may distinguish type of the terminal devices based on type allocation code (TAC) in International mobile equipment identities (IMEI). Therefore, the data analytics network element may use the IMEIs of the terminal devices as a matching feature. For another example, data packet features of a service corresponding to terminal devices of different operating systems may be different. Therefore, the data analytics network element may further use types of the operating systems of the terminal devices as a matching feature of the service.

The data analytics network element may further obtain a matching feature of a user granularity. For example, if a user is a merchant user, a terminal device held by the user performs a service at a fixed location for a long period of time. Therefore, the data analytics network element may use location information of the terminal device as a matching feature of the service. Optionally, the data analytics network element may obtain public network address information and port number information that are of the terminal device from an application server. Then the data analytics network element may query a network address translation (NAT) network element for internal network address information corresponding to the public network. The data analytics network element obtains, from a network manager, user identifier information, location information, and the like that are corresponding to the internal network address information.

In this embodiment of this application, the data analytics network element may use a big data analytics method in the prior art, to obtain a matching feature. This is not limited herein.

For ease of understanding, Table 1 is an example of a matching condition provided in this embodiment of this application for description. The matching condition includes a matching feature, a condition that the matching feature satisfies, and a feature index corresponding to each matching feature.

TABLE 1

| Feature index | Matching feature | Condition that the matching feature satisfies |
|---|---|---|
| 0 | Real-time reference signal receiving power (Real-time RSRP) | [−140, −40] |
| 1 | Cell identifier | [460001, 461000] |
| 2 | Terminal device model | {iPhone 5, iPhone 5S, iPhone 6, iPhone 6S, iPhone 7, Mate 8, Mate 9, P8, P9, P10} |
| 3 | Time (in a unit of a week) | {1, 2, 3, 4, 5, 6, 7} |
| 4 | Access network name (APN) | {default APN, IMS APN} |
| 5 | Uplink packet number (UL packet number) | [1, 100], N |
| 6 | Downlink packet number (DL packet number) | [1, 100], N |
| 7 | Server IP address | [128.123.10.1, 128.123.10.251] |
| 8 | Packet size average | [0, 64] |
| 9 | Packet size entropy | [0, 1.8] |
| ... | ... | ... |

Step 203: The data analytics network element sends at least one matching condition to a policy control network element.

The policy control network element may be the PCF network element in FIG. 1, or may be another network element that has a policy control function. This is not limited herein.

The data analytics network element may send a plurality of matching conditions corresponding to a plurality of service types to the policy control network element in a same message, or the data analytics network element may separately send the plurality of matching conditions corresponding to the plurality of service types to the policy control network element. The data analytics network element may actively send the matching condition to the policy control network element, or the data analytics network element may send the matching condition based on a request of the policy control network element. The data analytics network element may send the matching condition to the policy control network element in real time, or may send the matching condition to the policy control network element when a network is idle. This is not limited herein.

In a possible implementation, the data analytics network element may select some matching conditions from pre-obtained matching conditions in step 202 based on some matching features. Then, the selected matching conditions are used as the foregoing at least one matching condition and sent to the policy control network element. The one or more matching features may be matching features in the matching condition, or may be features that are not in the matching condition but that are associated with the matching condition. For example, the one or more matching features may be a data network name (DNN) and/or identifier information of the UPF network element corresponding to the data network. The data analytics network element may receive a message that is from a session management network element, and the message includes the DNN and/or the identifier information of the UPF network element. The data analytics network element selects, from the pre-obtained matching conditions, a matching condition consistent with the DNN and/or the identifier information of the UPF network element, and sends the matching condition to the policy control network element, so that a data throughput of the network may further be reduced.

The data analytics network element may send service type information corresponding to the at least one matching condition to the policy control network element. The service type information may be a service type corresponding to the matching condition, or the service type information may be indication information of a service type corresponding to the matching condition, for example, a number corresponding to the service type or matching condition. The service type information may be included in the corresponding matching condition and sent to the policy control network element, or the service type information may be separately sent to the policy control network element.

The data analytics network element may further send execution rule information corresponding to the matching condition to the policy control network element. The execution rule information may be a specific execution rule, or may be information related to an execution rule, for example, information that is of the feature and that is related to the execution rule in step 203.

Step 204: The policy control network element receives the at least one matching condition sent by the data analytics network element. The policy control network element sends at least some of the at least one matching condition to a user plane data processing network element.

The user plane data processing network element may be the user plane function network element in FIG. 1, or may be an access network device, or may be another network element that has a user plane data processing function. Specifically, the policy control network element may send the at least some matching conditions to the user plane data processing network element by using the session management network element.

In a possible implementation, the policy control network element may select some matching conditions from the received at least one matching condition based on the one or more matching features. The one or more matching features may be matching features in the matching condition, or may be features that are not in the matching condition but that are associated with the matching condition. For example, the policy control network element receives some matching features that are from the session management network element. Those features may be the DNN and/or the identifier information of the UPF network element corresponding to the data network. The policy control network element selects, from the received at least one matching condition, the matching condition consistent with the DNN and/or the identifier information of the UPF network element, uses the matching condition as the some matching conditions, and sends the matching condition to the user plane data processing network element.

The policy control network element may receive the service type information that is from the data analytics network element. The service type information may be a service type corresponding to the matching condition, or the service type information may be indication information of the service type corresponding to the matching condition, for example, a number corresponding to the service type or matching condition. The policy control network element may receive the service type information and the corresponding matching condition in a same message, or the policy control network element may separately receive the service type information and the corresponding matching condition.

The policy control network element may not receive the service type information from the data analytics network element, and the policy control network element may obtain the service type corresponding to the matching condition through analysis based on the some features in the matching condition, for example, determine, based on IP 5-tuple information, the service type corresponding to the matching condition.

The policy control network element may send the service type information corresponding to the at least some matching conditions to the user plane processing network element. The service type information and the at least some matching conditions may be sent in the same message, or may be separately sent. This is not limited herein.

The policy control network element may generate an execution rule for the corresponding service type based on the obtained service type information. The policy control network element may alternatively receive an execution rule that corresponds to the service type and that is from the data analytics network element. The policy control network element may alternatively receive a feature related to an execution rule from the data analytics network element, and then determine, based on the received feature, the execution rule corresponding to the matching condition. For example, the policy control network element may determine, based on information such as the radio channel quality, congestion level, packet loss rate, and switching threshold, the execution rule corresponding to the matching condition.

The policy control network element may send the execution rule corresponding to the at least some matching conditions to the user plane processing network element. The execution rule may be sent together with the at least some matching conditions and the service type information, or may be separately sent with the at least some matching conditions and the service type information. This is not limited herein.

Step 205: The user plane data processing network element receives at least some of the at least one matching condition from the policy control network element.

In a possible implementation, the user plane data processing network element may store the received matching condition.

In a possible implementation, when the user plane data processing network element cannot directly obtain some of matching features in the matching condition from the received user plane data (for example, a data packet), the user plane data processing network element may convert a matching feature that cannot be directly obtained in the matching condition into a matching feature that can be directly obtained. For example, the data packet received by the user plane data processing network element may not include user identifier information. If the matching features in the matching condition include the user identifier information, the user plane data processing network element may query an IP address pool, to obtain an IP address corresponding to the user identifier information, and then associate the IP address with the user identifier information. Therefore, the user plane data processing network element may match an IP address in the received data packet with the IP address in the matching condition.

The user plane data processing network element may receive the service type information that is from the policy control network element, and the service type information corresponds to the matching condition received by the user plane data processing network element. For a form and a receiving manner that are of the service type information, refer to steps 203 to 205. Details are not described herein again.

The user plane data processing network element may further receive the execution rule that is from the policy control network element, and the execution rule corresponds to the matching condition received by the user plane data processing network element. For a receiving manner of the execution rule, refer to step 204. Details are not described herein again.

Both step 203 and step 204 are optional steps. The data analytics network element alternatively sends at least one of the at least one matching condition, the service type information corresponding to the matching condition, or the execution rule information corresponding to the matching condition to the user plane data processing network element by using the session management network element through a service-oriented interface.

Step 206: The user plane data processing network element receives user plane data, and obtains, based on the matching condition received in step 205, a service type associated with the user plane data and/or an execution rule associated with the user plane data.

After receiving the user plane data, the user plane data processing network element determines a matching condition that the user plane data can match in the received matching condition. Then the user plane data processing network element obtains, based on the service type information or execution rule information corresponding to the matching condition, the service type associated with the user plane data or the execution rule associated with the user plane data. The user plane data processing network element may determine that the service type or execution rule corresponding to the matching condition is the service type associated with the user plane data or the execution rule associated with the user plane data. In this embodiment of this application, matching is performed on the matching condition, that is, whether the user plane data has a matching feature in the matching condition and whether the user plane data meets the condition that the matching feature satisfies are determined.

The user plane data processing network element may obtain, based on the service type of the user plane data, the execution rule corresponding to the user plane data; or, the user plane data processing network element determines the execution rule of the user plane data based on the execution rule information that corresponds to the matching condition and that is from the policy control network element or the data analytics network element.

After receiving the user plane data, the user plane data processing network element may sequentially match the received user plane data with the matching conditions, to determine the matching condition that the user plane data can match. In another possible implementation, after receiving the user plane data, the user plane data processing network element may select some matching conditions from the received matching conditions based on some matching features. Then the user plane data processing network element matches the received user plane data with the selected matching conditions. For example, the one or more matching features may be an IP address and/or a port number, and the user plane data processing network element selects, from the received matching conditions, a matching condition of which an IP address and/or a port number that are/is consistent with the IP address and/or the port number that correspond/corresponds to the user plane data.

When a matching condition is specifically matched, the user plane data processing network element may sequentially match the matching features in the matching condition. The user plane data processing network element may alternatively first match one or more matching features in the matching condition, and then match the remaining matching features. For example, if the matching features included in the matching condition are the data packet size, interval, entropy, IP address, port number, and the like, the user plane data processing network element may first determine that whether an IP address and a port number in the IP 5-tuple of the user plane data are consistent with the IP address and port number in the matching features, and if it is consistent, the user plane data processing network element continues to match other remaining features; or if it is inconsistent, the user plane data processing network element ends matching of the matching condition.

In a possible implementation, if the matching condition includes a feature that the user plane data processing network element cannot obtain on its own, the user plane data processing network element may obtain the feature from another network element. For example, if the matching condition includes location information of a terminal device, the user plane data processing network element obtains the location information of the terminal device from an access network device. Specifically, the user plane data processing network element may request the access network device to send the location information of the terminal device, or the user plane data processing network element may subscribe the location information of the terminal device from the access network device. This is not limited herein.

Step 207: The user plane data processing network element processes the user plane data based on the service type associated with the user plane data and/or the execution rule associated with the user plane data.

In a possible implementation, the user plane data processing network element processes the user plane data based on the service type associated with the user plane data. For example, the user plane data processing network element adds label information of the service type for the user plane data; or, the user plane data processing network element forwards the user plane data based on priority information of the service; or, the user plane data processing network element adds scheduling priority information for the user plane data; or, the user plane data processing network element determines that a destination IP address of the user plane data is an address of the terminal device, and the terminal device is in an idle state, and the user plane data processing network element sends paging priority information of the terminal device to the session management network element; or, the user plane data processing network element performs charging statistics on the user plane data based on the service type associated with the user plane data.

In another possible implementation, the user plane data processing network element processes the user plane data based on the obtained execution rule. For example, the user plane data processing network element forwards the user plane data based on service priority information indicated in the execution rule; or, the user plane data processing network element adds label information of the service type for the user plane data based on the execution rule; or, the user plane data processing network element adds scheduling priority information for the user plane data based on the execution rule; or, the user plane data processing network element determines that a destination IP address of the user plane data is an address of the terminal device, and the terminal device is in an idle state, and the user plane data processing network element sends paging priority information of the terminal device to the session management network element based on the execution rule; or, the user plane data processing network element performs charging statistics on the user plane data based on the execution rule associated with the user plane data.

In this embodiment, the user plane data processing network element obtains the at least one matching condition that is from the data analytics network element. The user plane data processing network element obtains, based on the received matching condition, the service type associated with the user plane data or the execution rule associated with the user plane data, thereby implementing data analytics by using the data analytics network element in the communications network. Further, the big data analytics method is used to obtain the service type or the execution rule associated with the user plane data, and deep packet inspection (DPI) does not need to be performed on the user plane data. The method of this embodiment is easier.

Figure 3:
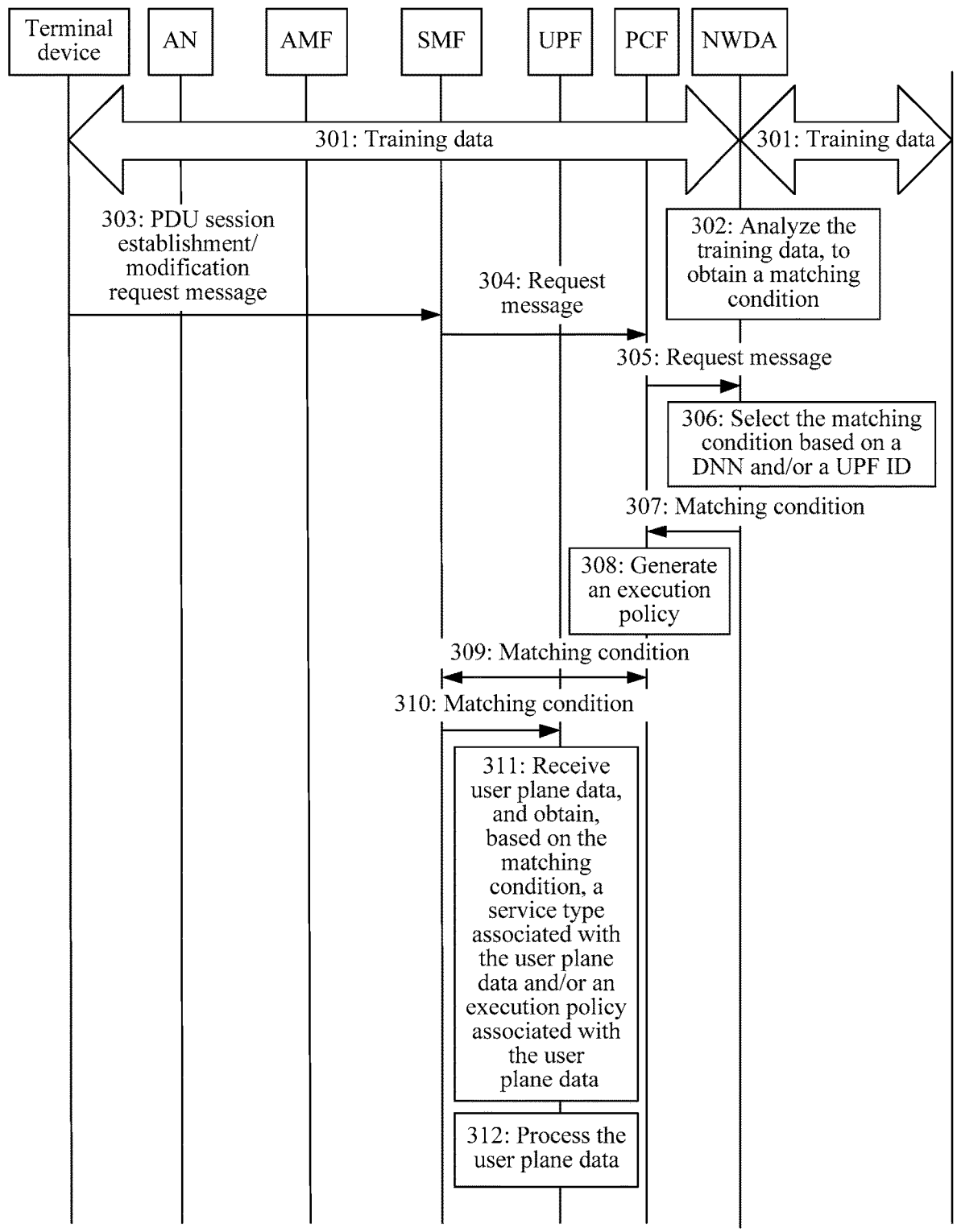
FIG. 3 is a schematic flowchart of a data analytics method according to a second embodiment of this application.

FIG. 3 is a schematic flowchart of a data analytics method according to a second embodiment of this application. In this embodiment, a data analytics network element being an NWDA network element, a user plane data processing network element being a UPF network element, and a third party server being an OTT server are used as an example for description. In this embodiment, the NWDA network element sends a matching condition to the UPF through a PDU session establishment/modification process initiated by UE. For a part of this embodiment that is the same as that of the second embodiment, refer to descriptions of the second embodiment. The data analytics method of this embodiment includes the following steps.

Step 301: The NWDA network element obtains training data from another network element.

For a manner of obtaining the training data by the NWDA network element, refer to step 201. Details are not described herein again.

Step 302: The NWDA network element analyzes the training data, to obtain the matching condition.

For details of the step, refer to step 202. Details are not described herein again.

Step 303: A terminal device requests an SMF network element to initiate the PDU session establishment/modification process through an AMF network element.

For the step, refer to a process in which the terminal device initiates a PDU session establishment/modification request in the prior art.

Step 304: The SMF network element sends a request message to a PCF network element, and the request message is used to request for an execution rule related to a PDU session. The execution rule related to the PDU session may be at least one of an execution policy, a control policy, a charging policy, and policy and charging control.

For the step, refer to a PDU connectivity access network (PDU-CAN) session establishment/modification process initiated by the SMF in the prior art.

Optionally, the request message includes a name of a data network (DNN) in which a service requested by the terminal device is located and/or a user plane function identifier (UPF ID) associated with the data network.

Step 305: The PCF network element sends the request message to the NWDA network element, and the request message is used to request for the matching condition.

Optionally, the requested matching condition is a matching condition corresponding to a service type requested by the terminal device.

Optionally, the request message includes the name of the data network in which the service requested by the terminal device is located and/or the user plane function identifier associated with the data network, that is, the DNN and/or UPF ID received by the PCF network element in step 304.

Step 306: After receiving the request message sent by the PCF network element, the NWDA network element selects, from the matching condition obtained in step 302, the matching condition consistent with the received DNN and/or UPF ID.

In a possible implementation, a matching feature in the matching condition includes the DNN and/or UPF ID. In another possible implementation, the matching feature in the matching condition excludes the DNN and/or UPF ID, but the DNN and/or UPF ID are/is associated with the matching condition.

The following uses the scenario in which the matching condition excludes the DNN, but the DNN is associated with the matching condition as an example for description. The matching condition obtained in step 302 and the DNN associated with the matching condition are shown in Table 2.

TABLE 2

| DNN 1 | Matching condition 1 |
|---|---|
| DNN 1 | Matching condition 2 |
| DNN 2 | Matching condition 3 |
| DNN 2 | Matching condition 4 |
| DNN 2 | Matching condition 5 |
| DNN 3 | Matching condition 6 |

If a name of the data network in which the service initiated by the terminal device is located is DNN 1, after receiving the request message sent by the PCF network element, NWDA network element selects, based on the DNN 1 carried in the request message, the matching condition 1 and the matching condition 2 that are associated with the DNN 1 from the matching condition 1 to the matching condition 6. Because the matching condition 3 to the matching condition 6 are not relevant to the service sent by the terminal device, the NWDA network element may not need to send the matching condition 3 to the matching condition 6 to the PCF network element, thereby reducing data throughputs between network elements.

Step 306 is an optional step. After receiving the request message sent by the PCF network element, the NWDA network element may skip performing step 306 and go directly to step 307.

Step 307: The NWDA network element sends the matching condition to the PCF network element.

When the NWDA network element performs step 306, the NWDA network element sends the matching condition selected by the NWDA network element in step 306 to the PCF network element. When the NWDA network element does not perform step 306, the NWDA network element sends a preset matching condition. Optionally, the preset matching condition may be all of matching conditions obtained by the NWDA network element, or may be a matching condition determined by the NWDA network element based on a current network situation. For details about a manner of which the NWDA network element sends the matching condition to the PCF network element, refer to the description in step 203.

The NWDA network element may further send the service type information corresponding to the matching condition to the PCF network element. The NWDA network element may further send an execution rule policy corresponding to matching condition to the PCF network element. For specific details, refer to step 203.

The NWDA network element may further send, to the PCF network element, the feature associated with the matching condition, for example, the DNN in Table 2.

In a possible implementation, the NWDA network element sends a response message of the request message in step 305 to the PCF network element, and the response message includes content sent by the foregoing NWDA network element to the PCF network element.

Step 308: The PCF network element generates the execution rule based on the service type information.

The PCF network element generates, based on the received service type information (for example, a service type), an execution rule corresponding to the service type (for example, a service quality policy).

Optionally, the PCF network element may further select an execution rule from the generated execution rule and from the execution rule received by the NWDA network element.

Step 309: The PCF network element sends the matching condition to the SMF network element.

The matching condition sent by the PCF network element to the SMF network element may be a matching condition that is received by the PCF network element and that is from the NWDA network element.

The matching condition sent by the PCF network element to the SMF network element may further be a matching condition corresponding to the service type requested by the terminal device.

Optionally, the PCF network element further sends the feature associated with the matching condition to the SMF network element.

The PCF network element further sends, to the SMF network element, the execution rule corresponding to the matching condition, for example, policy and charging control (PCC) rules. The execution rule may be generated by the PCF network element or received by the PCF network element from the NWDA network element. Further, the PCF network element also sends the service type information corresponding to the matching condition to the SMF network element. For descriptions of the execution rule and the service type information, refer to descriptions of the embodiment in FIG. 2.

In a possible implementation, the PCF network element sends the response message of the request message in step 304 to the SMF network element, and the response message includes content sent by the foregoing PCF network element to the SMF network element.

For the response message, refer to the PDU-CAN session establishment/modification process in the prior art.

Step 310: The SMF network element sends the matching condition to the UPF network element.

The matching condition sent by the SMF network element to the UPF network element may be the matching condition received by the SMF network element. Optionally, the SMF network element sends the feature associated with the matching condition to the UPF network element. The SMF network element may further send, to the UPF network element, the execution rule corresponding to the matching condition and/or the service type information corresponding to the matching condition.

In a possible implementation, in a session establishment/modification process initiated by the SMF network element to the UPF network element, the SMF network element sends the matching condition to the UPF network element.

Step 311: The UPF network element receives user plane data, and obtains, based on the received matching feature, a service type associated with the user plane data and/or an execution rule associated with the user plane data.

After the UPF network element receives the matching condition sent by the NWDA network element, if the UPF network element receives the user plane data, such as a data packet, the UPF network element may match the received user plane data with the matching condition, to obtain the service type or the execution rule associated with the user plane data. For specific details, refer to step 206.

Step 312: The user plane data processing network element processes the user plane data based on the service type associated with the user plane data and/or the execution rule associated with the user plane data.

For details of the step, refer to step 207. Details are not described herein again.

Figure 4:
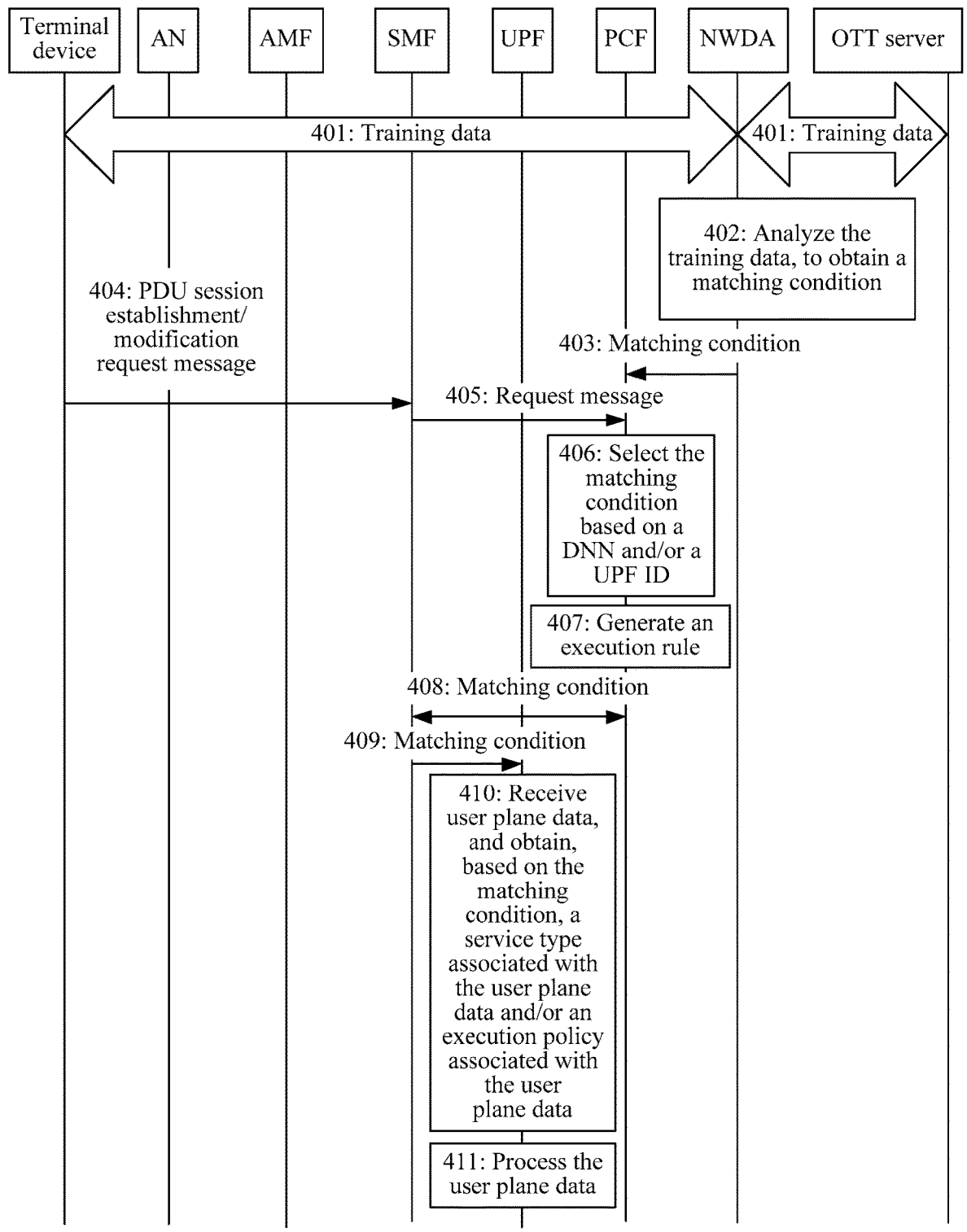
FIG. 4 is a schematic flowchart of a data analytics method according to a third embodiment of this application.

FIG. 4 is a schematic flowchart of a data analytics method according to a third embodiment of this application. The data analytics method of this embodiment is similar to the data analytics method in the second embodiment. For the same part, refer to the description of the second embodiment. The data analytics method of this embodiment includes the following steps.

For details of step 401 and step 402, refer to descriptions of step 301 and step 302.

Step 403: An NWDA network element sends a matching condition to a PCF network element. The matching condition may be a matching condition obtained by the NWDA network element in step 402 based on training data. For details about a manner of which the NWDA network element sends the matching condition to the PCF network element, refer to the description in step 203.

For details of step 404 and step 405, refer to descriptions of step 303 and step 304.

Step 406: After receiving a request message sent by an SMF, the PCF network element selects a matching condition consistent with a DNN and/or UPF ID from the matching condition received in step 403. For how does the PCF network element select the matching condition, refer to the method in which the NWDA network element selects the matching condition in step 306.

The step is an optional step, and when the step is not performed, step 407 may be directly performed.

Step 407: The PCF network element generates an execution rule based on service type information.

For details, refer to the description of step 308.

Step 408: The PCF network element sends the matching condition to the SMF network element.

In a possible implementation, when the PCF network element performs step 406, the PCF network element sends the matching condition selected by the PCF network element in step 406 to the SMF network element. When the PCF network element does not perform step 406, the PCF network element sends a preset matching condition to the SMF network element. Optionally, the preset matching condition may be all of matching conditions received by the PCF network element from the NWDA network element, or may be a matching condition determined by the PCF network element based on a current network situation. The matching condition sent by the PCF network element to the SMF network element may further be a matching condition corresponding to the service type requested by a terminal device.

In another possible implementation, the PCF network element may further send, to the SMF network element, the feature associated with the matching condition, for example, the DNN in Table 2. The PCF network element may further send the execution rule and/or service type indication information corresponding to the matching condition to the SMF network element. The execution rule may be generated by the PCF network element or received by the PCF network element from the NWDA network element.

In a possible implementation, the PCF network element sends a response message of the request message in step 405 to the SMF network element, and the response message includes content sent by the foregoing PCF network element to the SMF network element.

For details of step 409 to step 411, refer to descriptions of step 310 to step 312.

In the second embodiment and the third embodiment in this application, the NWDA network element sends the matching condition to the UPF network element through a PDU session establishment/modification process initiated by UE, the NWDA network element may further send the matching condition through a network device for a process in which a service of the terminal device establishes the QoS flow, and detailed descriptions are similar to the method in the second embodiment and the third embodiment. Details are not described herein again.

Figure 5:
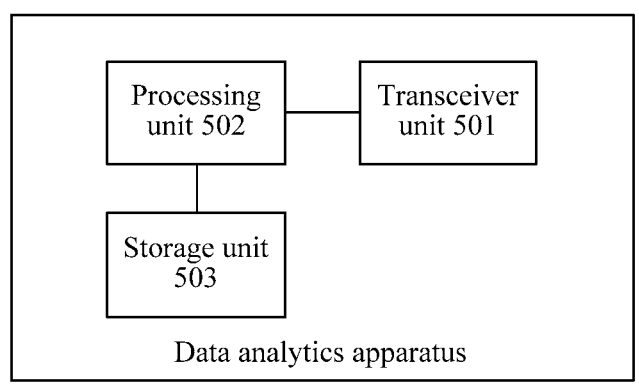
FIG. 5 is a schematic diagram of a data analytics apparatus according to an embodiment of this application.

FIG. 5 is a schematic diagram of a data analytics apparatus according to an embodiment of this application. The data analytics apparatus includes a transceiver unit 501, a processing unit 502, and a storage unit 503.

The transceiver unit 501 is configured to implement content exchange between the processing unit 502 and another unit or network element. Specifically, the transceiver unit 501 may be a communications interface of the data analytics apparatus, or may be a transceiver circuit or a transceiver, or may be a transceiver machine. The transceiver unit 501 may alternatively be a communications interface or a transceiver circuit of the processing unit 502. Optionally, the transceiver unit 501 may be a chip.

Although FIG. 5 shows only one transceiver unit 501, the data analytics apparatus may further include a plurality of transceiver units 501, or the transceiver unit 501 includes a plurality of sub transceiver units. The transceiver unit 501 may further include a sending unit and a receiving unit.

The processing unit 502 is configured to implement data processing performed by the data analytics apparatus. The processing unit 502 may be a processing circuit or may be a processor. The processor may be a central processing unit (CPU), a network processor (NP), or a combination of the CPU and the NP. The processor may further include a hardware chip. The foregoing hardware chip may be an application-specific integrated circuit (ASIC), a programmable logic device (PLD), or a combination thereof. The foregoing PLD may be a complex programmable logical device (CPLD), a field-programmable gate array (FPGA), a generic array logic (GAL), or a combination thereof.

Although FIG. 5 shows only one processing unit 502, the data analytics apparatus may further include a plurality of processing units, or the processing unit 502 includes a plurality of sub data processing units. Specifically, the processor may be a single-core (single-CPU) processor, or may be a multi-core (multi-CPU) processor.

The storage unit 503 is configured to store a computer instruction executed by the processing unit 502. The storage unit 503 may be a storage circuit or may be a memory. The memory may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache.

The storage unit 503 may be a unit independent of the processing unit 502, or may be a storage unit in the processing unit 502. This is not limited herein. Although FIG. 5 shows only one storage unit 503, the data analytics apparatus may further include a plurality of storage units 503, or the storage unit 503 includes a plurality of sub storage units.

In a possible implementation, the transceiver unit 501, the processing unit 502, and the storage unit 503 may be connected to each other by using a bus. The bus may be a peripheral component interconnect (PCI) bus, an extended industry standard architecture (EISA) bus, and or the like. The bus may be classified into an address bus, a data bus, a control bus, and the like.

In this embodiment of this application, the processing unit 502 enables, based on the computer instruction stored in the storage unit 503, the data analytics apparatus to implement the method in the first embodiment to the sixth embodiment of this application.

Specifically, the data analytics apparatus may be a user plane data processing network element, for example, a UPF network element, or a base station. The data analytics apparatus may also be a policy control network element, for example, a PCF network element. The data analytics apparatus may further be a data analytics network element, for example, an NWDA network element.

When the data analytics apparatus is the user plane data processing network element, the transceiver unit 501 is configured to obtain at least one matching condition that is from the data analytics network element and receive user plane data, where each of the at least one matching condition corresponds to at least one service type or at least one execution rule. The processing unit 502 is configured to obtain, based on the at least one matching condition, a service type associated with user plane data or an execution rule associated with the user plane data.

In a possible implementation, the processing unit 502 is specifically configured to determine, in the at least one matching condition, a matching condition that the user plane data satisfies. The transceiver unit 501 is further configured to obtain the execution rule that is from a policy control network element and that corresponds to the matching condition that the user plane data satisfies, or, obtain the execution rule that is from the data analytics network element and that corresponds to the matching condition that the user plane data satisfies.

In a possible implementation, the processing unit 502 is further configured to process the user plane data based on the service type associated with the user plane data or the execution rule associated with the user plane data.

The processing unit 502 is specifically configured to determine that a destination address of the user plane data is an address of a terminal device, and the terminal device is in an idle state; and send paging priority information of the terminal device to a session management network element based on the service type associated with the user plane data or the execution rule associated with the user plane data.

The processing unit 502 is specifically configured to forward the user plane data based on service priority information indicated in the execution rule associated with the user plane data. Or the processing unit 502 is specifically configured to add label information of the service type for the user plane data based on the service type associated with the user plane data or the execution rule associated with the user plane data. Alternatively, the processing unit 502 is specifically configured to add scheduling priority information for the user plane data based on the service type associated with the user plane data or the execution rule associated with the user plane data; or, the processing unit 502 is specifically configured to perform charging statistics on the user plane data based on the service type associated with the user plane data or policy and charging rules associated with the user plane data.

In a possible implementation, the processing unit 502 is further configured to determine, in the at least one matching condition, the matching condition that the user plane data satisfies. The transceiver unit 501 is further configured to obtain service type information that is from the data analytics network element and that corresponds to the matching condition that the user plane data satisfies. The processing unit 502 is specifically configured to obtain, based on the service type information, the service type associated with the user plane data.

In a possible implementation, each of the at least one matching condition includes at least one matching feature and a condition that the at least one matching feature satisfies. The processing unit 502 is specifically configured to determine that the user plane data has all or some of matching features of one matching condition, and meets a condition that the all or some of the matching features satisfy.

In a possible implementation, the processing unit 502 is specifically configured to obtain one or more matching features corresponding to the user plane data, select some matching conditions from the at least one matching condition based on the one or more matching features, and determine based on the selected matching conditions, the matching condition that the user plane data satisfies.

In a possible implementation, the one or more matching features corresponding to the user plane data includes IP 5-tuple information. The processing unit 502 is specifically configured to select, from the at least one matching condition, the matching condition of which IP 5-tuple information is consistent with the IP 5-tuple information of the user plane data.

In this embodiment, the transceiver unit 501 is further configured to implement content receiving and sending operations of the user plane data processing network element with an external network element in the first embodiment to the third embodiment of this application. The processing unit 502 is further configured to implement the processing operation of internal data or signaling of the user plane data processing network element in the first embodiment to the third embodiment of this application, for example, the processing unit 502 is configured to implement processing operations in step 311 and step 312 that are in the second embodiment.

In this embodiment, the processing unit 502 enables, based on the computer instruction stored in the storage unit 503, the user plane data processing network element to implement operations performed by the user plane data processing network element in the first embodiment to the third embodiment of this application.

Specifically, in a possible implementation, the processing unit 502 uses the transceiver unit 501 to obtain at least one matching condition that is from the data analytics network element, and each of the at least one matching condition corresponds to at least one service type or at least one execution rule; and the processing unit 502 obtains, based on the at least one matching condition, a service type associated with user plane data or an execution rule associated with the user plane data.

In a possible implementation, the processing unit 502 determines, in the at least one matching condition, the matching condition that the user plane data satisfies;

the processing unit 502 uses the transceiver unit 501 to obtain the execution rule that is from a policy control network element and that corresponds to the matching condition that the user plane data satisfies; or, the processing unit 502 uses the transceiver unit 501 to obtain the execution rule that is from the data analytics network element and that corresponds to the matching condition that the user plane data satisfies.

In a possible implementation, the processing unit 502 processes the user plane data based on the service type associated with the user plane data or the execution rule associated with the user plane data.

In a possible implementation, the processing unit 502 determines that a destination address of the user plane data is an address of a terminal device, and the terminal device is in an idle state; and uses the transceiver unit 501 to send paging priority information of the terminal device to a session management network element based on the service type associated with the user plane data or the execution rule associated with the user plane data.

In a possible implementation, the processing unit 502 forwards the user plane data based on service priority information indicated in the execution rule associated with the user plane data; or, the processing unit 502 adds label information of the service type for the user plane data based on the service type associated with the user plane data or the execution rule associated with the user plane data; or, the processing unit 502 adds scheduling priority information for the user plane data based on the service type associated with the user plane data or the execution rule associated with the user plane data; or, the processing unit 502 performs charging statistics on the user plane data based on the service type associated with the user plane data or policy and charging rules associated with the user plane data.

In a possible implementation, the processing unit 502 determines, in the at least one matching condition, the matching condition that the user plane data satisfies; uses the transceiver unit 502 to obtain the service type information that is from the data analytics network element and that corresponds to the matching condition that the user plane data satisfies; and the processing unit 502 obtains, based on the service type information, the service type associated with the user plane data. When the data analytics apparatus is the data analytics network element, the processing unit 502 is configured to obtain at least one matching condition, and each of the at least one matching condition corresponds to at least one service type or at least one execution rule. The transceiver unit 501 is configured to send the at least one matching condition to the user plane data processing network element.

In a possible implementation, the transceiver unit 501 is further configured to receive one or more matching features that are from the policy control network element. The processing unit 502 is specifically configured to select the at least one matching condition from pre-obtained matching conditions based on the one or more matching features.

In a possible implementation, the one or more matching features include a data network name and/or identifier information of the user plane data processing network element corresponding to the data network. The processing unit 502 is specifically configured to select, from the pre-obtained matching conditions, the matching condition consistent with the data network name and/or the identifier information of the user plane data processing network element corresponding to the data network.

In a possible implementation, the transceiver unit 501 is further configured to send the service type information corresponding to the at least one matching condition to the policy control network element or the user plane data processing network element.

In a possible implementation, the transceiver unit 501 is further configured to send the execution rule corresponding to the at least one matching condition to the policy control network element or the user plane data processing network element.

In a possible implementation, the transceiver unit 501 is further configured to obtain training data corresponding to at least one service type, and the processing unit 502 is specifically configured to obtain the at least one matching condition based on the training data.

In this embodiment, the transceiver unit 501 is further configured to implement content receiving and sending operations of the data analytics network element with an external network element in the first embodiment to the third embodiment of this application. The processing unit 502 is further configured to implement the processing operation of internal data or signaling of the data analytics network element in the first embodiment to the third embodiment of this application, for example, the processing unit 502 is configured to implement processing operations in step 302 and step 306 that are in the second embodiment.

In this embodiment, the processing unit 502 enables, based on the computer instruction stored in the storage unit 503, the data analytics network element to implement operations performed by the data analytics network element in the first embodiment to the sixth embodiment of this application.

Specifically, in a possible implementation, the processing unit 502 obtains at least one matching condition, and each of the at least one matching condition corresponds to at least one service type or at least one execution rule; and the processing unit 502 uses the transceiver unit 501 to send the at least one matching condition to the user plane data processing network element. In a possible implementation, the processing unit 502 uses the transceiver unit 501 to receive one or more matching features that are from the policy control network element; and the processing unit 502 selects the at least one matching condition from the pre-obtained matching conditions based on the one or more matching features.

In a possible implementation, the one or more matching features include the data network name and/or identifier information of the user plane data processing network element corresponding to the data network; and the processing unit 502 selects, from the pre-obtained matching conditions, the matching condition consistent with the data network name and/or the identifier information of the user plane data processing network element corresponding to the data network.

In a possible implementation, the processing unit 502 uses the transceiver unit 501 to send the service type information corresponding to the at least one matching condition to the policy control network element or the user plane data processing network element.

In a possible implementation, the processing unit 502 uses the transceiver unit 501 to send the execution rule corresponding to the at least one matching condition to the policy control network element or the user plane data processing network element.

In a possible implementation, the processing unit 502 uses the transceiver unit 501 to obtain training data corresponding to at least one service type, and the processing unit 502 obtains the at least one matching condition based on the training data.

When the data analytics apparatus is the policy control network element, the processing unit 502 is configured to obtain at least one matching condition that is from the data analytics network element through the transceiver unit 501, and each of the at least one matching condition corresponds to at least one service type or at least one execution rule. The processing unit 502 is further configured to send at least some of the at least one matching condition to the user plane data processing network element through transceiver unit 501.

In a possible implementation, the processing unit 502 is further configured to select the at least some matching conditions from the at least one matching condition based on some matching features.

In a possible implementation, the one or more matching features include a data network name and/or identifier information of the user plane data processing network element corresponding to the data network. The processing unit 502 is specifically configured to select, from the at least one matching condition, the matching condition consistent with the data network name and/or the identifier information of the user plane data processing network element corresponding to the data network.

In a possible implementation, the transceiver unit 501 is further configured to send the service type information corresponding to the at least some matching conditions to the user plane data processing network element.

In a possible implementation, the transceiver unit 501 is further configured to send the execution rule corresponding to the at least some matching conditions to the user plane data processing network element.

In a possible implementation, the transceiver unit 501 is further configured to obtain the service type information that is from the data analytics network element and that corresponds to the at least some matching conditions. The processing unit 502 is further configured to generate, based on the obtained service type information, the execution rule corresponding to the at least some matching conditions. The transceiver unit 501 is further configured to send the execution rule corresponding to the at least some matching conditions to the user plane data processing network element.

In this embodiment, the transceiver unit 501 is further configured to implement content receiving and sending operations of the policy control network element with an external network element in the first embodiment to the third embodiment of this application. The processing unit 502 is further configured to implement the processing operation of internal data or signaling of the policy control network element in the first embodiment to the third embodiment of this application, for example, the processing unit 502 is configured to implement the processing operation in step 308 in the second embodiment.

In this embodiment, the processing unit 502 enables, based on the computer instruction stored in the storage unit 503, the policy control network element to implement operations performed by the policy control network element in the first embodiment to the sixth embodiment of this application.

Specifically, in a possible implementation, the processing unit 502 uses the transceiver unit 501 to obtain at least one matching condition that is from the data analytics network element, and each of the at least one matching condition corresponds to at least one service type or at least one execution rule; and the processing unit 502 uses the transceiver unit 501 to send at least some of the at least one matching condition to the user plane data processing network element.

In a possible implementation, the processing unit 502 selects at least some matching conditions from the at least one matching condition based on some matching features.

In a possible implementation, the one or more matching features include the data network name and/or identifier information of the user plane data processing network element corresponding to the data network; and the processing unit 502 selects, from the at least one matching condition, the matching condition consistent with the data network name and/or the identifier information of the user plane data processing network element corresponding to the data network.

In a possible implementation, the processing unit 502 uses the transceiver unit 501 to send the service type information corresponding to the at least some matching conditions to the user plane data processing network element.

In a possible implementation, the processing unit 502 uses the transceiver unit 501 to send the execution rule corresponding to the at least some matching conditions to the user plane data processing network element.

In a possible implementation, the processing unit 502 uses the transceiver unit 501 to obtain the service type information that is from the data analytics network element and that corresponds to the at least some matching conditions; the processing unit 502 generates, based on the obtained service type information, the execution rule corresponding to the at least some matching conditions; and in a possible implementation, the execution rule corresponding to the at least some matching conditions is sent to the user plane data processing network element.

All or some of the foregoing embodiments may be implemented by using software, hardware, firmware, or any combination thereof. When software is used to implement the embodiments, the embodiments may be implemented completely or partially in a form of a computer program product. The computer program product may include one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a solid-state drive (SSD)), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the foregoing system, apparatus, and unit, reference may be made to a corresponding process in the foregoing method embodiments. This not limited herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data analytics method, comprising:
    obtaining, by a user plane data processing network element, at least one matching condition from a data analytics network element, wherein each of the at least one matching condition corresponds to at least one service type or at least one execution rule; and
    obtaining, by the user plane data processing network element based on the at least one matching condition, a service type associated with user plane data or an execution rule associated with user plane data;
    wherein the obtaining, by the user plane data processing network element based on the at least one matching condition, a service type associated with user plane data comprises:
        determining, by the user plane data processing network element, a matching condition that the user plane data satisfies, wherein the matching condition that the user plane data satisfied is comprised in the at least one matching condition;
        obtaining, by the user plane data processing network element, service type information that is from the data analytics network element and that corresponds to the matching condition that the user plane data satisfies; and
        obtaining, by the user plane data processing network element based on the service type information, the service type associated with the user plane data.

2. The method according to claim 1, wherein the obtaining, by the user plane data processing network element based on the at least one matching condition, an execution rule associated with the user plane data further comprises:
    obtaining, by the user plane data processing network element, the execution rule that is from a policy control network element and that corresponds to the matching condition that the user plane data satisfies; or
    obtaining, by the user plane data processing network element, the execution rule that is from the data analytics network element and that corresponds to the matching condition that the user plane data satisfies.

3. The method according to claim 2, wherein each of the at least one matching condition comprises at least one matching feature and a condition that the at least one matching feature satisfies; and
    the determining, by the user plane data processing network element, the matching condition that the user plane data satisfies comprises:
    determining, by the user plane data processing network element, that the user plane data has all or some of matching features of one matching condition, and meets a condition that the all or some of the matching features satisfy.

4. The method according to claim 2, wherein
    the determining, by the user plane data processing network element, the matching condition that the user plane data satisfies comprises:
    obtaining, by the user plane data processing network element, one or more matching features corresponding to the user plane data;

selecting, by the user plane data processing network element, some matching conditions from the at least one matching condition based on the one or more matching features; and determining, by the user plane data processing network element based on the selected matching conditions, the matching condition that the user plane data satisfies.

5. The method according to claim 4, wherein the one or more matching features corresponding to the user plane data comprise Internet protocol IP 5-tuple information; and the selecting, by the user plane data processing network element, some matching conditions from the at least one matching condition based on the one or more matching features comprises:

selecting, by the user plane data processing network element from the at least one matching condition, the matching condition of which IP 5-tuple information is consistent with the IP 5-tuple information of the user plane data.

6. The method according to claim 1, wherein the method further comprises:

processing, by the user plane data processing network element, the user plane data based on the service type associated with the user plane data or the execution rule associated with the user plane data.

7. The method according to claim 6, wherein the processing, by the user plane data processing network element, the user plane data based on the service type associated with the user plane data or the execution rule associated with the user plane data comprises:

determining, by the user plane data processing network element, that a destination address of the user plane data is an address of a terminal device, and the terminal device is in an idle state; and sending, by the user plane data processing network element, paging priority information of the terminal device to a session management network element based on the service type associated with the user plane data or the execution rule associated with the user plane data.

8. The method according to claim 6, wherein the processing, by the user plane data processing network element, the user plane data based on the service type associated with the user plane data or the execution rule associated with the user plane data comprises:

forwarding, by the user plane data processing network element, the user plane data based on service priority information indicated in the execution rule associated with the user plane data; or adding, by the user plane data processing network element, label information of the service type for the user plane data based on the service type associated with the user plane data or the execution rule associated with the user plane data; or adding, by the user plane data processing network element, scheduling priority information for the user plane data based on the service type associated with the user plane data or the execution rule associated with the user plane data; or performing, by the user plane data processing network element, charging statistics on the user plane data based on the service type associated with the user plane data or policy and charging rules associated with the user plane data.

9. A data analytics apparatus, comprising:
a transceiver unit, configured to obtain at least one matching condition that is from a data analytics network element, wherein each of the at least one matching condition corresponds to at least one service type or at least one execution rule; and a processing unit, configured to obtain, based on the at least one matching condition, a service type associated with user plane data or an execution rule associated with the user plane data;

wherein the processing unit is further configured to determine, in the at least one matching condition, the matching condition that the user plane data satisfies;

the transceiver unit is further configured to obtain service type information that is from the data analytics network element and that corresponds to the matching condition that the user plane data satisfies; and the processing unit is-configured to obtain, based on the service type information, the service type associated with the user plane data.

10. The apparatus according to claim 9, wherein
the transceiver unit is further configured to obtain the execution rule that is from a policy control network element and that corresponds to the matching condition that the user plane data satisfies, or, obtain the execution rule that is from the data analytics network element and that corresponds to the matching condition that the user plane data satisfies.

11. The apparatus according to claim 10, wherein each of the at least one matching condition comprises at least one matching feature and a condition that the at least one matching feature satisfies; and the processing unit is configured to determine that the user plane data has all or some of matching features of one matching condition, and meets a condition that the matching features satisfy.

12. The apparatus according to claim 10, wherein
the processing unit is configured to obtain one or more matching features corresponding to the user plane data, select some matching conditions from the at least one matching condition based on one or more matching features, and determine based on the selected matching conditions, the matching condition that the user plane data satisfies.

13. The apparatus according to claim 12, wherein the one or more matching features corresponding to the user plane data comprises IP 5-tuple information; and the processing unit is configured to select, from the at least one matching condition, the matching condition of which IP 5-tuple information is consistent with the IP 5-tuple information of the user plane data.

14. The apparatus according to claim 9, wherein
the processing unit is further configured to process the user plane data based on the service type associated with the user plane data or the execution rule associated with the user plane data.

15. The apparatus according to claim 14, wherein the processing unit is configured to determine that a destination address of the user plane data is an address of a terminal device, and the terminal device is in an idle state; and send paging priority information of the terminal device to a session management network element based on the service type associated with the user plane data or the execution rule associated with the user plane data.

16. The apparatus according to claim 14, wherein
the processing unit is configured to forward the user plane data based on service priority information indicated in the execution rule associated with the user plane data; or the processing unit is configured to add label information of the service type for the user plane data based on the service type associated with the user plane data or the execution rule associated with the user plane data; or the processing unit is configured to add scheduling priority information for the user plane data based on the service type associated with the user plane data or the execution rule associated with the user plane data; or the processing unit is configured to perform charging statistics on the user plane data based on the service type associated with the user plane data or policy and charging rules associated with the user plane data.

17. A system, comprising:
a user plane data processing apparatus, configured to obtain at least one matching condition from a data analytics network element, wherein each of the at least one matching condition corresponds to at least one service type or at least one execution rule, and to obtain, based on the at least one matching condition, a service type associated with user plane data or an execution rule associated with user plane data; and
the data analytics network element, configured to send the at least one matching condition to the user plane data processing apparatus;
wherein the user plane data processing apparatus is further configured to:
determine, in the at least one matching condition, the matching condition that the user plane data satisfies;
obtain service type information that is from the data analytics network element and that corresponds to the matching condition that the user plane data satisfies; and
obtain, based on the service type information, the service type associated with the user plane data.

18. The system according to claim 17, wherein the user plane data processing apparatus is further configured to process the user plane data based on the service type associated with the user plane data or the execution rule associated with the user plane data.

19. A data analytics method, comprising:
sending, by a data analytics network element, at least one matching condition to a user plane data processing apparatus;
obtaining, by the user plane data processing network element, the at least one matching condition, wherein each of the at least one matching condition corresponds to at least one service type or at least one execution rule; and
obtaining, by the user plane data processing network element based on the at least one matching condition, a service type associated with user plane data or an execution rule associated with user plane data;
wherein the obtaining, by the user plane data processing network element based on the at least one matching condition, a service type associated with user plane data comprises:
determining, by the user plane data processing network element, a matching condition that the user plane data satisfies, wherein the matching condition that the user plane data satisfied is comprised in the at least one matching condition;
obtaining, by the user plane data processing network element, service type information that is from the data analytics network element and that corresponds to the matching condition that the user plane data satisfies; and
obtaining, by the user plane data processing network element based on the service type information, the service type associated with the user plane data.

* * * * *

UNITED STATES PATENT AND TRADEMARK OFFICE
CERTIFICATE OF CORRECTION

PATENT NO. : 11,617,092 B2
APPLICATION NO. : 16/832719
DATED : March 28, 2023
INVENTOR(S) : Weiwei Chong et al.

It is certified that error appears in the above-identified patent and that said Letters Patent is hereby corrected as shown below:

In the Claims

In Column 30, Line 16, in Claim 9, delete "is-configured" and insert -- is configured --.

Signed and Sealed this
Thirtieth Day of May, 2023

Katherine Kelly Vidal
*Director of the United States Patent and Trademark Office*